(12) United States Patent
Ahn et al.

(10) Patent No.: US 11,091,144 B2
(45) Date of Patent: Aug. 17, 2021

(54) ENGINE CONTROL METHOD AND SYSTEM OF HYBRID ELECTRIC VEHICLE

(71) Applicants: Hyundai Motor Company, Seoul (KR); Kia Motors Corporation, Seoul (KR)

(72) Inventors: Hyun-Mo Ahn, Seoul (KR); Min-Kyu Lee, Seoul (KR); Doo-Il Won, Seoul (KR); Yun-Chan Heo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 281 days.

(21) Appl. No.: 16/201,288

(22) Filed: Nov. 27, 2018

(65) Prior Publication Data
US 2019/0202433 A1  Jul. 4, 2019

(30) Foreign Application Priority Data

Dec. 28, 2017 (KR) .................. 10-2017-0182736

(51) Int. Cl.
*B60W 20/13* (2016.01)
*B60W 10/06* (2006.01)
(Continued)

(52) U.S. Cl.
CPC ............ *B60W 20/13* (2016.01); *B60W 10/02* (2013.01); *B60W 10/06* (2013.01); *F02D 13/02* (2013.01);
(Continued)

(58) Field of Classification Search
CPC ........... B60W 20/13; B60W 30/18127; B60W 2510/244; B60W 2710/06; B60W 2710/0627; B60W 10/08; B60W 30/18136; B60W 2510/0604; B60W 10/06; B60W 10/02; B60W 2710/0616; B60W 2710/021; F02D 13/0203; F02D 41/123; F02D 29/02; F02D 13/04; F02D 13/0261; F02D 41/0005; F02D 13/02; F02D 41/0002; F02D 2041/001; F02D 2041/002; F02D 2200/503; F02N 11/04; F02N 2200/061; B60K 6/387; Y02T 10/70; Y02T 10/62; Y02T 10/40;
(Continued)

(56) References Cited

U.S. PATENT DOCUMENTS

2008/0318728 A1* 12/2008 Soliman ................ B60K 6/442
477/4

FOREIGN PATENT DOCUMENTS

KR  10-2006-0024157 A  3/2006
KR  10-1541711 B1  8/2015
KR  101765643 B1  8/2017

OTHER PUBLICATIONS

Wikipedia article, Engine Braking (Year: 2017).*

* cited by examiner

*Primary Examiner* — Alan D Hutchinson
(74) *Attorney, Agent, or Firm* — Mintz Levin Cohn Ferris Glovsky and Popeo, P.C.; Peter F. Corless

(57) ABSTRACT

An engine control method of a hybrid electric vehicle is provided. The method includes detecting a state of charge (SOC) of a main battery of the hybrid electric vehicle and detecting whether a brake requires operation when the main battery is in a fully-charged state or a charging-limiting state. An engine fuel cut of the hybrid electric vehicle is executed when a request for the engine brake is generated and an engine is operated to maximize an engine load of the hybrid electric vehicle.

6 Claims, 6 Drawing Sheets

(51) Int. Cl.
*B60W 10/02* (2006.01)
*F02D 13/02* (2006.01)
*F02D 41/00* (2006.01)
*B60K 6/387* (2007.10)
*F02D 41/12* (2006.01)
*F02D 29/02* (2006.01)
*F02D 13/04* (2006.01)
*F02N 11/04* (2006.01)

(52) U.S. Cl.
CPC ......... *F02D 13/0261* (2013.01); *F02D 13/04* (2013.01); *F02D 29/02* (2013.01); *F02D 41/0002* (2013.01); *F02D 41/0005* (2013.01); *F02D 41/123* (2013.01); *B60K 6/387* (2013.01); *B60W 2710/021* (2013.01); *B60W 2710/0616* (2013.01); *F02D 2041/001* (2013.01); *F02D 2041/002* (2013.01); *F02D 2200/503* (2013.01); *F02N 11/04* (2013.01); *F02N 2200/061* (2013.01)

(58) Field of Classification Search
CPC .. B60L 58/12; B60Y 2200/92; B60Y 2200/91
See application file for complete search history.

ENGINE CONTROL METHOD AND SYSTEM OF HYBRID ELECTRIC VEHICLE

CROSS-REFERENCE(S) TO RELATED APPLICATIONS

This application claims priority to Korean Patent Application No. 10-2017-0182736, filed on Dec. 28, 2017 which is incorporated herein by reference in its entirety.

BACKGROUND

Field of the Invention

The present disclosure relates to an engine control method and system, and more particularly, to an engine control method of a hybrid electric vehicle that protects a main battery from being overcharged.

Description of Related Art

A hybrid vehicle generally refers to a vehicle that is driven by an efficient combination of two or more different types of power sources. A hybrid vehicle in many cases, however, refers to a vehicle that obtains driving force from an electric motor driven by an engine using fuel and battery power, which is a so-called hybrid electric vehicle. Examples of the hybrid electric vehicle include a hybrid electric vehicle (HEV) and a plug-in hybrid electric vehicle (PHEV). The HEV or PHEV places emphasis on protecting a main battery from being overcharged when the main battery is in a fully-charged state or a charging-limiting state, by not charging the battery any longer to protect the battery and continuously driving the engine using a hybrid start generator (HSG) to allow the main battery to be discharged to a maximum.

However, when the battery is fully charged, even a slight charge may cause a safety problem due to the overcharged main battery. In addition, when the main battery is in the fully-charged state or the charging-limiting state, the hybrid vehicle which secures a brake force using a regenerative braking of a motor may be unable to use the regenerative braking either and may be required to secure the brake force using an engine brake. Accordingly, the vehicle needs to secure more brake force of the engine brake. In other words, when the regenerative braking of the motor is not available, in response to a driver's request for the brake force, the brake force of the engine brake instead of the regenerative braking of the motor needs to be combined with a hydraulic brake force to generate a total brake force.

The contents mentioned in the section are merely provided to assist in understanding of the present disclosure, and it may include contents that have been already known to those skilled in the art and are not the related art.

SUMMARY

An exemplary embodiment of the present disclosure provides an engine control method and system of a hybrid electric vehicle that protects a main battery from being overcharged and secures a brake force of an engine brake. Other objects and advantages of the present disclosure may be understood by the following description, and become apparent with reference to the exemplary embodiments of the present disclosure. Also, it is obvious to those skilled in the art to which the present disclosure pertains that the objects and advantages of the present disclosure may be realized by the means as claimed and combinations thereof.

In accordance with an exemplary embodiment of the present disclosure, an engine control method of a hybrid electric vehicle may include: detecting a state of charge (SOC) of a main battery of the hybrid electric vehicle; detecting whether a brake needs to be operated when the main battery is in a fully-charged state or a charging-limiting state as a detection result of the SOC of the main battery; performing a engine fuel cut of the hybrid electric vehicle when the request for the engine brake is generated as the detection whether the brake needs to be operated; and operating an engine to maximize an engine load of the hybrid electric vehicle.

When the hybrid electric vehicle is a hybrid electric vehicle in which an engine clutch is between an engine and a drive motor, after performing the engine fuel cut of the hybrid electric vehicle, the method may include engaging the engine clutch by detecting whether the engine clutch is engaged. In the operating of the engine to maximize the engine load, a throttle valve may be adjusted to be in a minimum open position. In the operating of the engine to maximize the engine load, a CAM may be adjusted to be in a maximum retard to minimize a valve overlap section.

In accordance with another exemplary embodiment of the present disclosure, an engine control method of a hybrid electric vehicle may include: detecting whether a brake needs to be operated when a regenerative braking of the hybrid electric vehicle is not available; performing a engine fuel cut of the hybrid electric vehicle when the request for the engine brake is generated; and operating an engine to maximize an engine load of the hybrid electric vehicle.

When the hybrid electric vehicle is a hybrid electric vehicle in which an engine clutch is between an engine and a drive motor, after performing the engine fuel cut of the hybrid electric vehicle, the method may include engaging the engine clutch by detecting whether the engine clutch is engaged. In the operating of the engine to maximize the engine load, a throttle valve may be adjusted to be at a minimum open position. In addition, in the operating of the engine to maximize the engine load, a cam may be adjusted to be in a maximum retard to minimize a valve overlap section.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
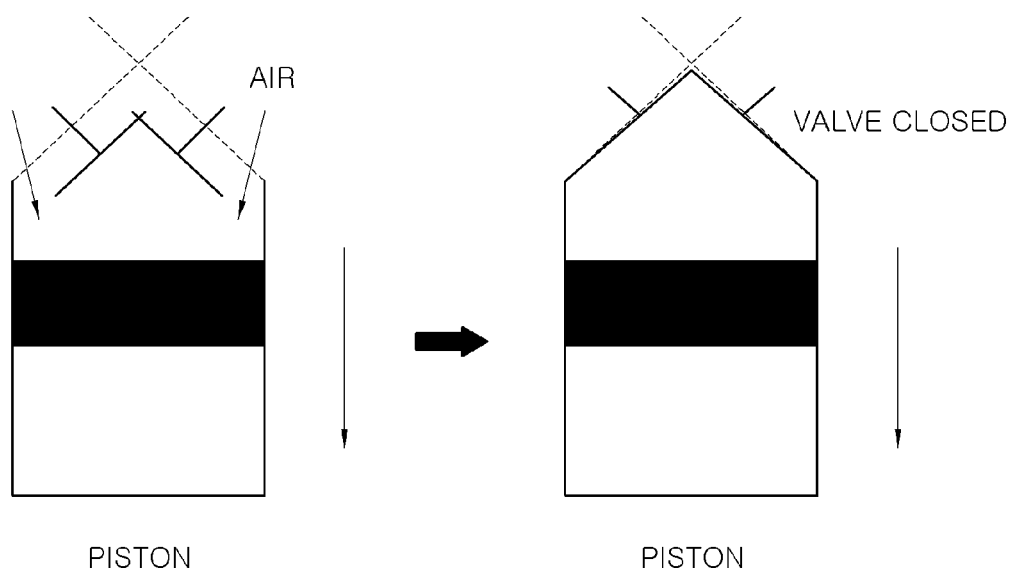
FIGS. 1 to 3 are views illustrating a concept of an engine control method according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In order to sufficiently understand the present disclosure, operational advantages of the present disclosure, and objects accomplished by exemplary embodiments of the present disclosure, the accompanying drawings illustrating exemplary embodiments of the present disclosure and contents described in the accompanying drawings should be referred to.

Figure 2:
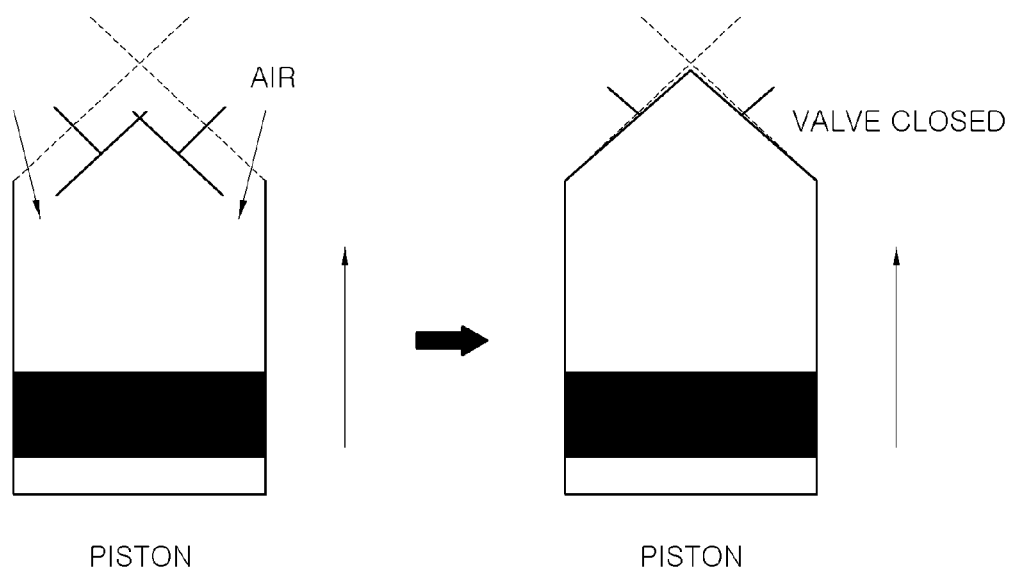
Figure 3:
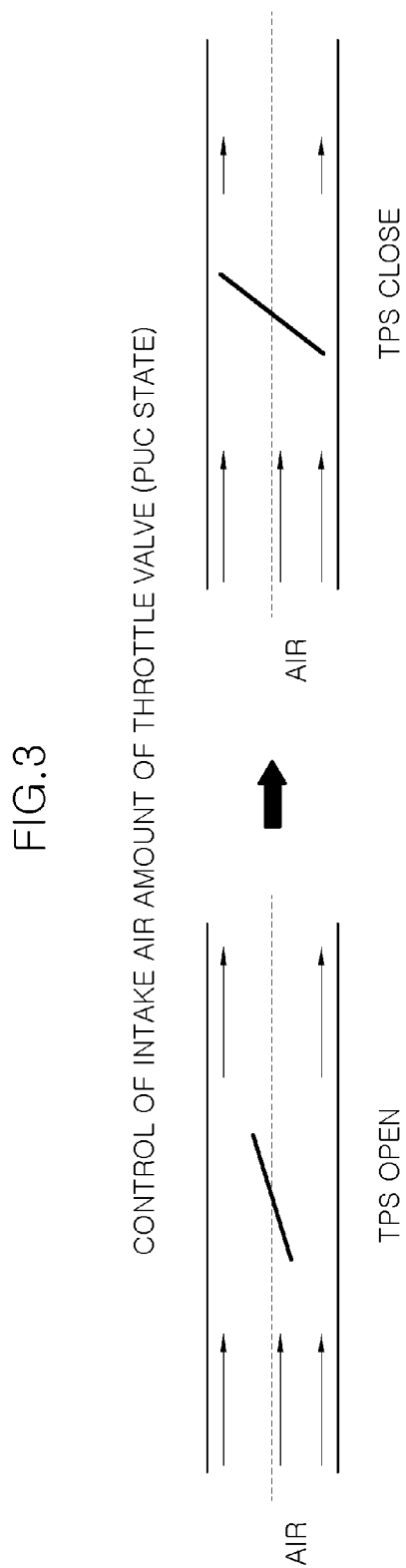
Figure 4:
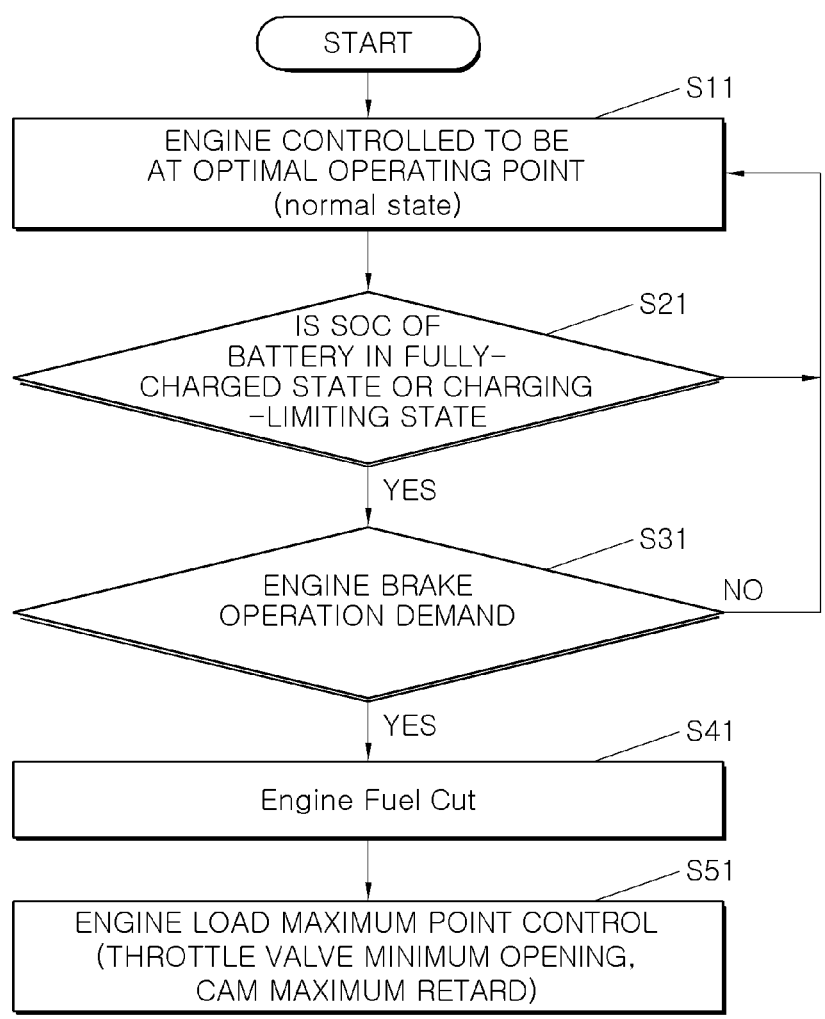
FIG. 4 is a view illustrating an engine control method of a hybrid electric vehicle according to an exemplary embodiment of the present disclosure.

FIGS. 1 to 3 are views illustrating a concept of an engine control method of the present disclosure and FIG. 4 is a view illustrating an engine control method of a hybrid electric vehicle according to an exemplary embodiment of the present disclosure. Hereinafter, an engine control method of a hybrid electric vehicle according to an exemplary embodiment of the present disclosure will be described with reference to the drawings.

The engine control method of the present disclosure may protect a battery from being overcharged by operating an engine of a hybrid electric vehicle (HEV) or a plug-in hybrid electric vehicle (PHEV); and may secure a brake force of an engine brake to be a maximum when the battery is fully charged. The present disclosure solves the above-discussed problem by operating the engine to have a poor efficiency by changing the throttle valve and the cam to maximize the load of the engine without using the optimum point of the existing engine control, allowing the battery to be discharged to the maximum.

In other words, as illustrated in FIGS. 1 and 2, when a piston changes between a top dead center and a bottom dead center, a cam is conventionally varied to slightly open a valve to minimize a piston resist and thereby, securing the engine efficiency to be the constant maximum. The present disclosure, however, operates the engine to have a lowest engine efficiency by adjusting a throttle valve and the cam under a particular condition. In other words, the throttle valve may be operated to be closed to the maximum as a detection result of a throttle valve position sensor (TPS) and the cam may be adjusted to be in the maximum retard, such that a minimized valve overlap results in a maximized resist, a minimized efficiency and an enlarged engine resist as shown in FIG. 3.

Furthermore, there are cases where the minimum opening value of the throttle valve is set to about 1° or a specific angle for each engine design specification of the vehicle. The throttle valve angle at which the engine load is maximized may be set to an initially set minimum TPS opening value of the engine. The present disclosure may protect the battery from being overcharged by adjusting the engine load to be maximum and may further secure the brake force of the engine brake by the engine brake when the regenerative braking is impossible.

In FIG. 4 sequentially showing these processes, in a state where the vehicle engine is operated to be at an optimal point (S11), a state of charge (SOC) of the battery may be sensed and in response thereto, determined whether the battery is in a fully-charged state or a charging-limiting state may be determined (S21). In particular, the method described herein below may be executed by a controller having a processor and a memory.

When the battery is fully charged, the engine may be driven continuously using a hybrid starter generator (HSG) to discharge the battery to the maximum. When the battery is in the fully-charged state or the charging-limiting state based on the determination result of S21, the overcharged battery may cause a problem or damage. The present disclosure may protect the battery from being overcharged in advance by operating the engine to maximize the engine load (S51) to induce the maximum SOC discharge using the HSG.

After the S21 determination, according to the determination of whether the engine brake needs to be operated (S30), the engine load may be adjusted to be maximum (S41) when the engine brake operation is demanded. In other words, the brake force of the engine brake may be demanded to be secured since a regenerative braking is not available due to the battery being in the fully-charged state or the charging-limiting state. Accordingly, when the engine brake needs to be operated (S31), an engine fuel cut may be performed (S41), and the engine load may be adjusted to be maximized (S51), and thus, the engine brake may generate a greater brake force.

Figure 5:
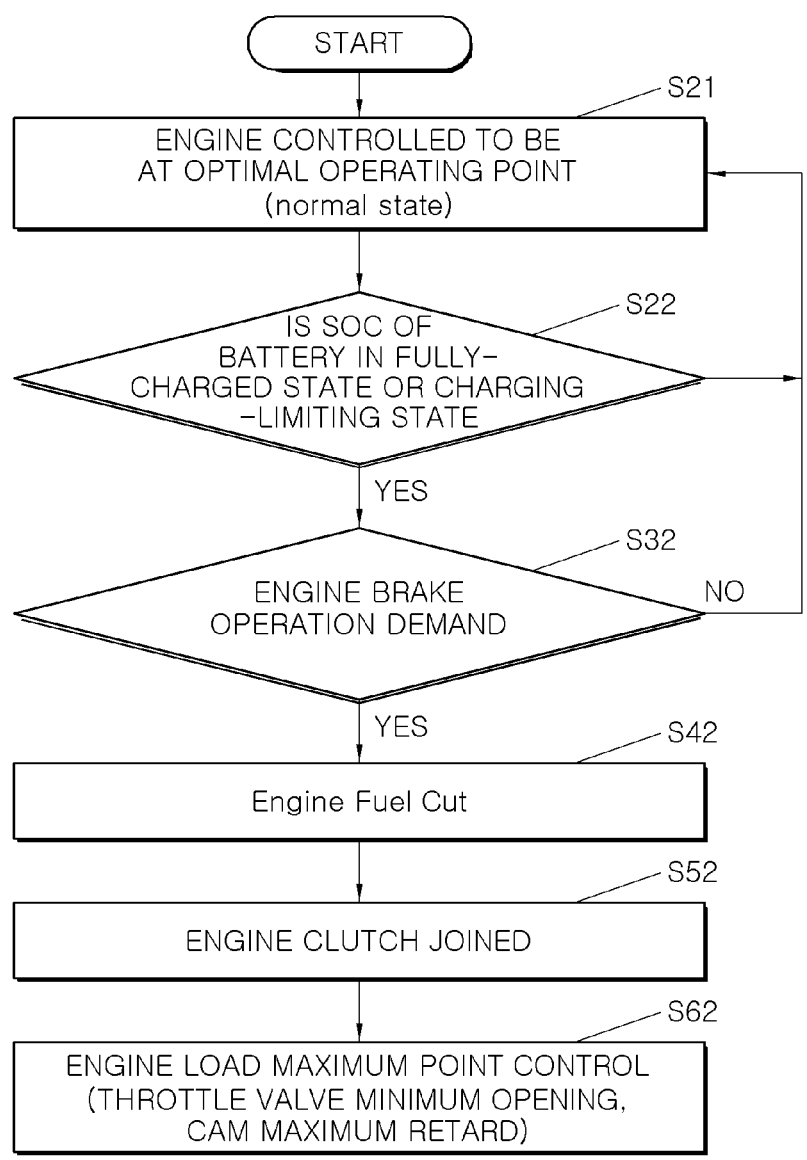
FIG. 5 is a view illustrating an engine control method of a hybrid electric vehicle according to another exemplary embodiment of the present disclosure.

Furthermore, when the vehicle is a transmission mounted electric device (TMED) system in which an engine clutch is between the engine and the drive motor, the engine control method of the hybrid electric vehicle may be executed according to another exemplary embodiment shown in FIG. 5. In other words, when the SOC of the battery is in the full state or the battery charging-limiting state (S22) while the engine of the vehicle is adjusted to the optimum point (S12), if there is a request for the engine brake (S32), the engine fuel cut may be performed (S42). After the engine fuel cut is performed (S42), the engine clutch may be engaged (S52), and the engine load may be maximized (S62).

Particularly, the adjusting of the engine load to be a maximize (S51 and S62) causing engine efficiency to be a lowest point (S40) may increase the engine load by adjusting the throttle valve to be in a minimum open position by the TPS as described above. In addition, the cam may be adjusted to be in a maximum retard to thus minimize the valve overlap and increase the engine load.

Figure 6:
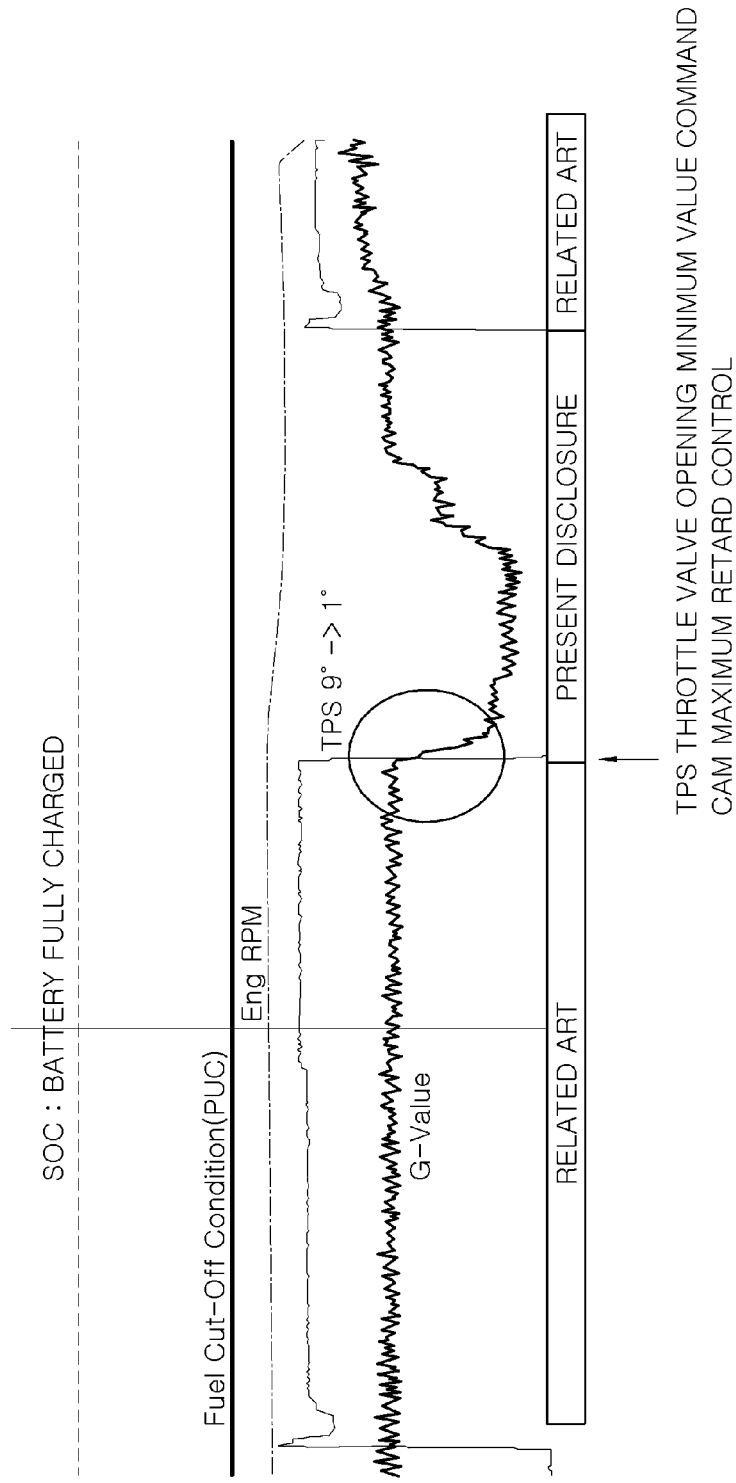
FIG. 6 is a view showing a change in a brake force of an engine brake according to an exemplary embodiment of the present disclosure.

FIG. 6 is a view showing a change in a brake force of an engine brake of the present disclosure. FIG. 6 illustrates a change of G-value (e.g., acceleration using an acceleration sensor) as a result of the TPS control from about 9° to 1°, through which the brake force of the engine brake in the present disclosure is shown to secure a greater amount of brake force compared to a conventional brake force. The set TPS opening amount may be different according to the engine design specification.

The brake force may be secured through a regenerative braking of a motor when a main battery is in neither a fully-charged state nor a charging-limiting state. However, since the regenerative braking is unavailable when the main battery is in the fully-charged state or the charging-limiting state, an instruction may be transmitted related to a fuel cut-off condition (hereinafter, PUC) where a fuel supply is stopped and the engine is driven by coasting. In other words, the controller may be configured to receive a fuel cut-off signal. At this time, for the TMED hybrid system, the brake force needs to be secured through the engine brake while the engine clutch between the motor and the engine is engaged. However, the brake force through the engine brake may be difficult since an electric power steering system (EPS), the cam and the like are adjusted to be at the optimal point for an engine drive.

Accordingly, when the engine brake needs to be operated, energy necessary to drive the engine may become greater by adjusting the engine load to be maximized without using the optimal point but to be a lowest point, and accordingly, as a loss in the engine-driving energy increases, the brake force secured through the engine brake may increase. In addition, when the battery is fully charged and necessary to be discharged, the engine may be driven using the HSG. In particular, the engine load may be demanded to be maximized since the object at this time is a maximum discharge and the engine is thus recommended to expend maximum energy.

In accordance with exemplary embodiments of the present disclosure, an engine control method of a hybrid electric vehicle may protect a battery from being overcharged by decreasing an engine efficiency and discharging the battery when the battery of the hybrid electric vehicle is in a fully-charged state or a charging-limiting state; and thereby, preventing a resultant safety problem in advance. Further, when an engine brake needs to be operated, since a regenerative braking is unavailable, a proper brake feeling may be possible by an increased brake force caused by an increased loss in engine-driving energy covering an insufficient brake force.

Although the present disclosure has been described with reference to the accompanying drawings, it is obvious to those skilled in the art that the present disclosure is not limited to the exemplary embodiments described above, but may be variously modified and altered without the spirit and scope of the present disclosure. Therefore, these modifications and alterations are to be considered to belong to the claims, and the scope of the present disclosure is to be interpreted on the basis of the claims.

What is claimed is:

1. An engine control method of a hybrid electric vehicle, comprising:
    detecting, by a controller, a state of charge (SOC) of a main battery of the hybrid electric vehicle;
    detecting, by the controller, whether a brake requires operation when the main battery is in a fully-charged state or a charging-limiting state based on the detected SOC of the main battery;
    performing, by the controller, an engine fuel cut of the hybrid electric vehicle when a request for the engine brake is generated based on determining that the brake requires operation; and
    operating, by the controller, an engine to maximize an engine load of the hybrid electric vehicle,
    wherein in the operating of the engine to maximize the engine load, a throttle valve is adjusted to be in a minimum open position such that an intake air amount is minimized, and
    wherein in the operating of the engine to maximize the engine load, a cam mounted at a cam shaft is adjusted to be in a maximum retard to minimize overlapped time between an open time of an intake valve of a cylinder and an open time of an exhaust valve of the cylinder.

2. The method of claim 1, further comprising:
    engaging, by the controller, the engine clutch by when the hybrid electric vehicle is a hybrid electric vehicle having the engine clutch between an engine and a drive motor, after performing the engine fuel cut of the hybrid electric vehicle.

3. An engine control method of a hybrid electric vehicle, comprising:
    detecting, by a controller, whether a brake requires operation when a regenerative braking of the hybrid electric vehicle is unavailable;
    performing, by the controller, an engine fuel cut of the hybrid electric vehicle when a request for the engine brake is generated based on determining that the brake requires operation; and
    operating, by the controller, an engine to maximize an engine load of the hybrid electric vehicle,
    wherein in the operating of the engine to maximize the engine load, a throttle valve is adjusted to be in a minimum open position such that an intake air amount is minimized, and
    wherein in the operating of the engine to maximize the engine load, a cam mounted at a cam shaft is adjusted to be in a maximum retard to minimize overlapped time between an open time of an intake valve of a cylinder and an open time of an exhaust valve of the cylinder.

4. The method of claim 3, further comprising:
    engaging, by the controller, the engine clutch when the hybrid electric vehicle is a hybrid electric vehicle in which the engine clutch between an engine and a drive motor, after performing the engine fuel cut of the hybrid electric vehicle.

5. An engine control system of a hybrid electric vehicle, comprising:
   a sensor configured to detecting a state of charge (SOC) of a main battery of the hybrid vehicle;
   a controller configured to:
      detect whether a brake requires operation when the main battery is in a fully-charged state or a charging-limiting state based on the detected SOC of the main battery;
      perform an engine fuel cut of the hybrid electric vehicle when a request for the engine brake is generated based on determining that the brake requires operation; and
      operate an engine to maximize an engine load of the hybrid electric vehicle;
   a throttle valve configured to be adjusted by the controller to be in a minimum open position to operate the engine to minimize an intake air amount; and
   a cam configured to be adjusted by the controller to be in a maximum retard to minimize overlapped time between an open time of an intake of a cylinder and an open time of an exhaust valve of the cylinder.

6. The system of claim 5, wherein the controller is further configured to:
   engage the engine clutch by when the hybrid electric vehicle is a hybrid electric vehicle having an engine clutch between an engine and a drive motor, after performing the engine fuel cut of the hybrid electric vehicle.

* * * * *